(12) United States Patent
Rambo

(10) Patent No.: US 11,168,951 B2
(45) Date of Patent: Nov. 9, 2021

(54) ENTRAINMENT HEAT EXCHANGER

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 990 days.

(21) Appl. No.: 15/210,434

(22) Filed: Jul. 14, 2016

(65) Prior Publication Data

US 2018/0017342 A1 Jan. 18, 2018

(51) Int. Cl.
| | |
|---|---|
| F28F 9/22 | (2006.01) |
| F28D 7/16 | (2006.01) |
| F28F 13/06 | (2006.01) |
| F28F 27/02 | (2006.01) |
| F28F 13/08 | (2006.01) |
| F28D 21/00 | (2006.01) |

(52) U.S. Cl.
CPC .............. *F28F 9/22* (2013.01); *F28D 7/1623* (2013.01); *F28F 13/06* (2013.01); *F28F 13/08* (2013.01); *F28F 27/02* (2013.01); *F05D 2260/213* (2013.01); *F28D 2021/0026* (2013.01); *F28F 2009/228* (2013.01)

(58) Field of Classification Search
CPC ............ F28D 7/1623; F28D 2021/0026; F24F 13/26; F28F 9/22; F28F 13/06; F28F 13/08; F28F 27/02; F28F 2009/228; F05D 2260/213; F02K 3/115
USPC ......................................... 165/129
See application file for complete search history.

(56) References Cited

U.S. PATENT DOCUMENTS

| | | | | |
|---|---|---|---|---|
| 1,830,719 | A | * 11/1931 | Rollins | ............... F24D 19/0002 137/630.19 |
| 2,074,551 | A | 3/1937 | Knight et al. | |
| 2,655,346 | A | 10/1953 | Corbitt et al. | |
| 2,734,447 | A | * 2/1956 | Kurek | .................... G05D 16/18 454/284 |
| 2,854,915 | A | * 10/1958 | Carr | ......................... F24F 1/01 454/263 |
| 2,913,227 | A | * 11/1959 | Bottorf | ..................... F24F 1/01 165/123 |

(Continued)

FOREIGN PATENT DOCUMENTS

| | | |
|---|---|---|
| CN | 101624932 A | 1/2010 |
| CN | 105275620 A | 1/2016 |

(Continued)

OTHER PUBLICATIONS

International Search Report and Written Opinion issued in connection with corresponding PCT Application No. PCT/US2017/040802 dated Jan. 2, 2018.

(Continued)

*Primary Examiner* — Travis C Ruby
(74) *Attorney, Agent, or Firm* — Dinsmore & Shohl LLP

(57) ABSTRACT

A heat exchanger apparatus includes: a shell extending over a flow length from an inlet at a upstream end to an outlet at a downstream end, and defining a first flowpath for a first fluid; a structure disposed within the shell defining a second flowpath for a second fluid; at least one secondary inlet in the shell disposed downstream from the upstream end; and a nozzle disposed downstream of the inlet.

20 Claims, 7 Drawing Sheets

(56) References Cited

U.S. PATENT DOCUMENTS

| | | | |
|---|---|---|---|
| 3,217,788 A * | 11/1965 | Jakob | F24F 13/26 165/298 |
| 3,409,274 A * | 11/1968 | Lawton | B01F 5/0485 366/144 |
| 3,799,246 A * | 3/1974 | Osheroff | F15C 1/04 165/297 |
| 3,815,487 A * | 6/1974 | Teodorescu | F24F 13/26 454/344 |
| 3,841,392 A * | 10/1974 | Osheroff | F24F 1/01 165/214 |
| 3,853,173 A * | 12/1974 | Osheroff | F24F 1/01 165/213 |
| 3,981,326 A * | 9/1976 | Gorchev | F24F 13/26 137/895 |
| 4,123,800 A * | 10/1978 | Mazzei | B01F 5/0653 366/163.2 |
| 4,448,111 A * | 5/1984 | Doherty | F24F 1/01 454/256 |
| 4,589,478 A | 5/1986 | Wunder | |
| 4,743,405 A * | 5/1988 | Durao | C02F 3/1294 261/76 |
| 4,815,531 A | 3/1989 | Presz, Jr. et al. | |
| 5,056,586 A | 10/1991 | Bemisderfer | |
| 5,318,109 A * | 6/1994 | Yamada | F22B 37/40 165/135 |
| 5,613,552 A * | 3/1997 | Osakabe | F28D 15/0233 165/104.21 |
| 5,927,390 A * | 7/1999 | Lehman | B60K 11/04 165/122 |
| 6,004,204 A * | 12/1999 | Luxton | F24F 13/26 454/263 |
| 6,164,078 A | 12/2000 | Lak et al. | |
| 6,578,627 B1 | 6/2003 | Liu et al. | |
| 7,167,363 B1 * | 1/2007 | Cushman | H05K 7/1461 361/690 |
| 7,481,265 B2 | 1/2009 | Youssef | |
| 8,174,833 B2 * | 5/2012 | Kitanaka | B60L 9/16 361/710 |
| 8,261,527 B1 | 9/2012 | Stearns et al. | |
| 8,329,126 B2 * | 12/2012 | Freeman | B01D 53/86 423/210 |
| 8,376,031 B2 | 2/2013 | Yang et al. | |
| 8,690,098 B2 | 4/2014 | Todorovic | |
| 8,827,544 B2 * | 9/2014 | Bachman | B23P 19/00 366/167.1 |
| 9,047,066 B2 * | 6/2015 | Mongia | G06F 1/203 |
| 9,067,678 B2 * | 6/2015 | Edom | F24F 13/072 |
| 10,064,316 B2 * | 8/2018 | Ono | H01L 23/467 |
| 2008/0006021 A1 | 1/2008 | Schwartz | |
| 2008/0016845 A1 | 1/2008 | Zysman et al. | |
| 2011/0030829 A1 * | 2/2011 | Nilsson | F28F 1/04 138/42 |
| 2011/0315354 A1 * | 12/2011 | Johnson | H05K 7/20636 165/104.33 |
| 2012/0015600 A1 * | 1/2012 | Larsson | F24F 13/26 454/254 |
| 2012/0186672 A1 * | 7/2012 | Fisenko | B01F 5/0423 137/565.01 |
| 2015/0047315 A1 * | 2/2015 | Snyder | F02K 3/115 60/204 |
| 2015/0129040 A1 * | 5/2015 | Hartig | B63J 2/02 137/1 |
| 2015/0292352 A1 * | 10/2015 | Marche | F02C 7/143 415/116 |
| 2016/0018128 A1 * | 1/2016 | Bunis | F24F 1/01 454/205 |
| 2016/0369697 A1 * | 12/2016 | Schwarz | F02C 9/18 |

FOREIGN PATENT DOCUMENTS

| | | | | |
|---|---|---|---|---|
| EP | 1 876 328 A2 | 1/2008 | | |
| EP | 1 882 824 A2 | 1/2008 | | |
| EP | 3 045 698 A1 | 7/2016 | | |
| EP | 3 106 646 A1 | 12/2016 | | |
| GB | 394407 A | * | 6/1933 | F28D 1/0233 |
| JP | S56-10692 A | 2/1981 | | |
| JP | S61130793 A | 6/1986 | | |
| WO | 98/09115 A1 | 3/1998 | | |

OTHER PUBLICATIONS

Chinese Patent Application No. 201780043565.X Office Action, dated Mar. 26, 2021 (15 pages with English Translation).

* cited by examiner

ENTRAINMENT HEAT EXCHANGER

BACKGROUND OF THE INVENTION

This invention relates generally to heat transfer apparatus and more particularly to heat exchangers.

A heat exchanger is a device in which fluids at different temperatures are brought into close proximity so that heat can be transferred from one fluid to the other.

Heat exchangers have numerous physical configurations, as they are often incorporated into machines or vehicles where they must fit into compact or unusually shaped spaces, for example within a nacelle enclosing a gas turbine engine.

There is particularly an interest in high aspect ratio heat exchangers having a relatively small frontal area and extending over a long axial length, in order to fit into compact spaces.

It is well-known that the heat transfer rate in a heat exchanger is proportional to the temperature difference between the fluids, referred to as delta T ($\Delta T$). One problem with high aspect ratio heat exchangers is that they can have a relatively poor performance because cooling potential is rapidly reduced as the cold fluid picks up heat along the flow length, reducing the temperature difference.

BRIEF SUMMARY OF THE INVENTION

The above-noted problem is addressed by a heat exchanger in which one of the fluids is periodically refreshed by entrainment of additional flow.

According to one aspect of the technology described herein, a heat exchanger apparatus includes: a shell extending over a flow length from an inlet at a upstream end to an outlet at a downstream end, and defining a first flowpath for a first fluid; a structure disposed within the shell defining a second flowpath for a second fluid; at least one secondary inlet in the shell disposed downstream from the upstream end; and a nozzle disposed downstream of the inlet.

According to another aspect of the technology described herein, a heat exchanger apparatus for a gas turbine engine includes: a shell extending over a flow length from an inlet at a upstream end to an outlet at a downstream end, and defining a first flowpath for a first fluid, wherein the shell has a characteristic dimension at the inlet, and an aspect ratio of the flow length divided by the characteristic dimension is unity or greater; a plurality of tubes disposed within the shell extending traverse to the flow direction, and defining a second flowpath for a second fluid; at least one secondary inlet in the shell disposed downstream from the upstream end; and a nozzle disposed downstream of the at least one secondary inlet.

According to another aspect of the technology described herein, a method of operating a heat exchanger includes: flowing a primary flow of a first fluid at a first temperature through a shell that extends over a flow length from an inlet at a upstream end to an outlet at a downstream end; flowing a second fluid at a second temperature different from the first temperature through a structure disposed within the shell, such that heat is transferred from one of the fluids to the other fluid, entraining a secondary flow of a fluid into the shell through at least one secondary inlet in the shell disposed downstream from the upstream end.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
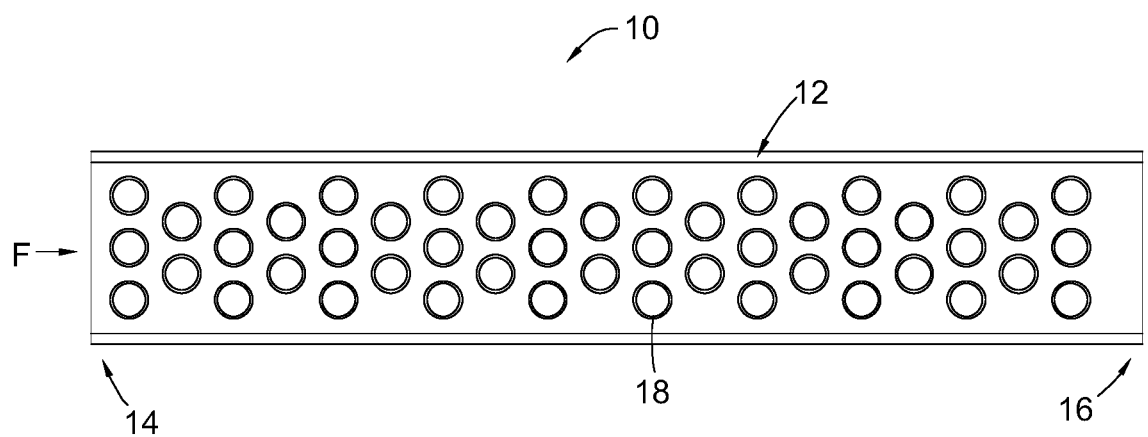
FIG. 1 is a schematic cross-sectional view of a prior art heat exchanger.

Referring to the drawings wherein identical reference numerals denote the same elements throughout the various views, FIG. 1 depicts a prior art heat exchanger 10. The heat exchanger 10 is of the shell-and-tube type including a shell or housing 12 having upstream and downstream ends 14 and 16 respectively, and a plurality of tubes 18 extending across the shell 12.

In operation, a first fluid at a first temperature, also referred to herein as a coolant, flows through the shell 12 and around the tubes 18 in a direction from the upstream end 14 to the downstream end 16 is shown by the arrow "F". A second fluid at a second temperature higher than the first temperature flows through the tubes 18.

It is noted that the term "fluid" is used in the generic sense herein, meaning a substance tending to flow with take the shape of its container and may refer to liquids, gases, or combinations thereof.

Heat energy flows from the second fluid through the walls of the tubes 18 and into the coolant and is subsequently carried away. The rate of heat flow, characterized as energy per unit time, is proportional to the difference in temperature ($\Delta T$) between the first fluid and the second fluid.

In practice, the temperature difference is not consistent over the length of the heat exchanger 10 because the temperature of the coolant increases as it flows over the tubes 18. So for example a first temperature difference near the upstream end 14 will be greater than a second temperature difference near the downstream end 16. This characteristic is exacerbated with growing heat exchanger length. This results in a heat exchanger 10 being less effective than desired. This characteristic is illustrated by the curve labeled "A" in FIG. 2.

To avoid the loss of effectiveness described above, a heat exchanger may be configured in such a way that an additional fresh coolant is entrained into the primary flow of coolant at one or more downstream locations. To accomplish the entrainment, a vena contracta or nozzle is provided which increases fluid velocity and therefore decreases local static pressure, providing a driving force for entraining additional coolant. As used herein the term "nozzle" refers to any structure which accomplishes this function regardless of its physical configuration. This principle may be embodied in various physical configurations. Examples of suitable configurations are described below.

While the examples below are described in the context of using the first fluid to cool the second fluid, it will be understood that the primary function of the heat exchanger is to transfer heat from one fluid to the other and that the end-use is not critical to understanding of the invention. For example, the heat exchangers described herein may be used with a liquid such as engine lubricating oil flowing through the interior of the tubes, and using a gas such as ram air or engine bleed air flowing through the shell around the tubes. The ultimate purpose of this heat transfer process could be to lower the temperature of the lubricating oil or to raise the temperature of the air, or both. It will also be understood that the relative temperatures of the two fluids may be the inverse of the example described herein, i.e. the flow through the tubes could be colder than the flow through the shell.

Figure 3:
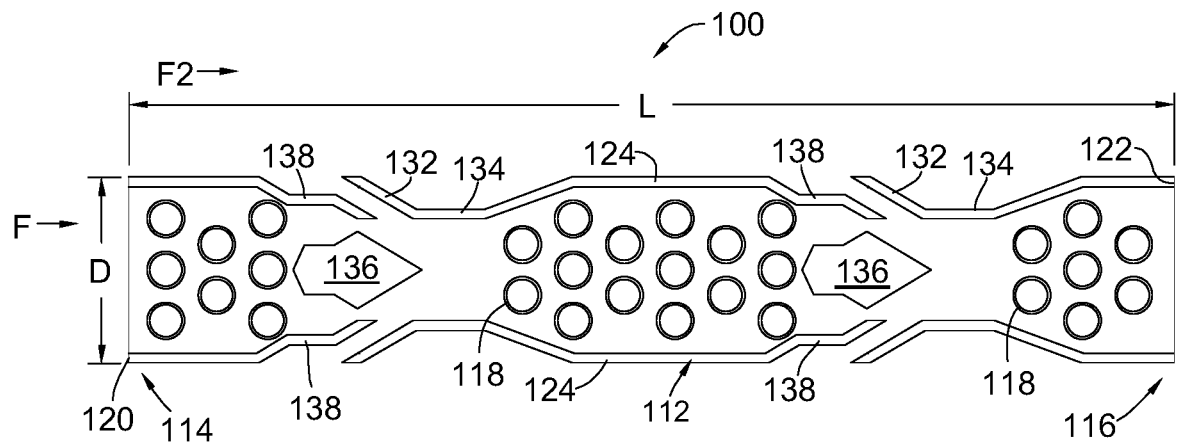
FIG. 3 is a schematic cross-sectional view of a heat exchanger with an entrainment feature.
Figure 4:
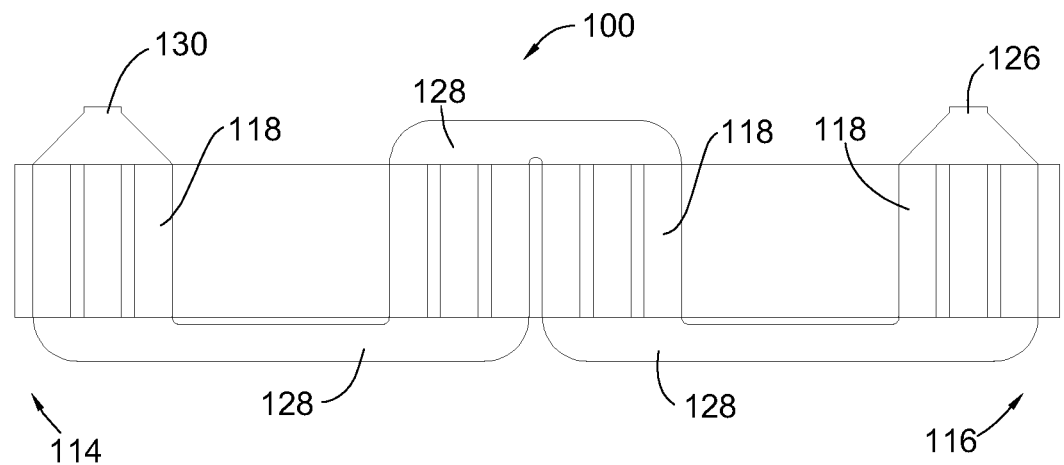
FIG. 4 is a schematic top view of the heat exchanger of FIG. 3.

FIGS. 3 and 4 illustrate an exemplary heat exchanger 100 using this entrainment principle. The heat exchanger 100 is of the shell-and-tube type including a shell or housing 112 having an upstream end 114 defining an inlet 120, and a downstream end 116 defining an outlet 122. The shell 112 is defined by walls 124. The heat exchanger 100 has an overall flow length "L" and has a frontal area at the inlet 120 which is defined by one or more characteristic dimensions. For example if the inlet 120 is circular its radius or diameter may be a characteristic dimension. In other examples the inlet 120 may be rectangular or an annular shape. FIG. 3 illustrates a characteristic dimension "D" which is representative of a radial height. Generally as used herein a "high aspect ratio" heat exchanger refers to a device in which at least one of the frontal area characteristic dimensions is less that the flow length. In the illustrated example this corresponds to an aspect ratio L/D being unity or greater. The flow length may be several multiples of the frontal area. It will be understood that the illustrated heat exchanger 100 is merely an example, and that it may represent a portion of a larger or longer heat exchanger.

A plurality of tubes 118 extend across the interior of the shell 112 transverse to the flow direction and may be grouped into a plurality of banks or bundles. The bundles can have differing amounts of tubes 118 and can be spaced at variable lengths. It is noted that the tubes 118 are merely one example of a structure defining a flow path for a fluid. As seen in FIG. 4, an inlet duct 126 is provided to direct flow into the most downstream tube bundle. Each pair of adjacent tube bundles are interconnected with a return manifolds 128, and the most upstream tube bundle is connected to an outlet duct 130. The inlet duct 126, return manifolds 128, and in the duct 130 are configured to define a serpentine flowpath through the bundles of tubes 118. The serpentine flowpath is but one example of how the flow could be directed through the tubes 118 and numerous other configurations are possible.

At one or more locations downstream from the upstream end 114, the shell 112 is configured to define a nozzle or area reduction 132. In the illustrated example, the walls 124 are pinched in to define a throat 134 of minimum flow area. A centerbody 136 is disposed within the shell 112 just upstream of the throat 134. The shell 112 further includes one or more secondary inlets 138 just upstream of the throat 134.

In operation, a first fluid at a first temperature, also referred to as a coolant, flows through the shell 112 in a direction from the upstream end 114 to the downstream end 116 as shown by the arrow F. This may be referred to as a "primary flow". The first fluid also flows around the outside of the shell 112 in a "secondary flow", denoted by the arrow F2. A second fluid at a second temperature flows through the tubes 118.

As the coolant flows through the nozzle 132, the fluid velocity is increased, therefore decreasing local static pressure. This provides a driving force for entraining additional coolant flowing exterior to the shell 112 (i.e. the secondary flow) through the secondary inlets 138. This additional entrained coolant mixes with the primary flow that has already passed over an upstream bundle of the tubes 118. The result is that the temperature of the primary fluid downstream of the secondary inlets 138 is lower than would otherwise be in the absence of entrainment.

Figure 2:
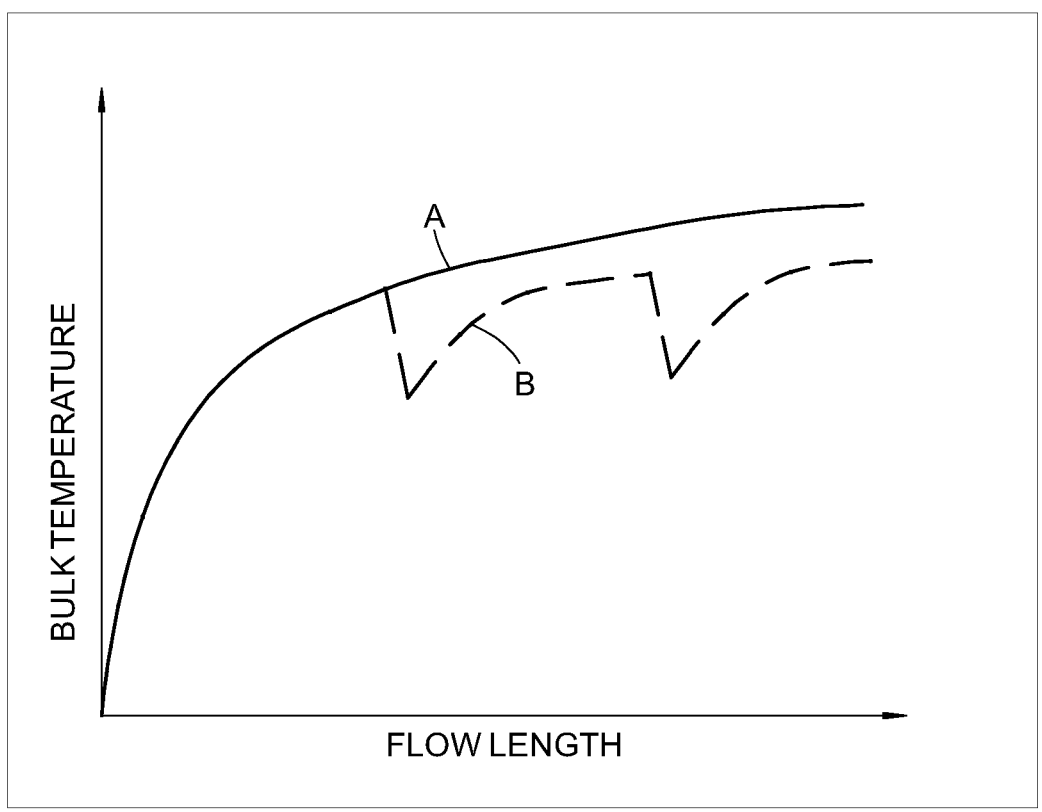
FIG. 2 is a graph showing coolant bulk temperature profile versus flow length.

FIG. 2 illustrates the temperature characteristics of the primary fluid with entrainment or refreshment. Referring to curve "B", can be seen that there is a temperature rise along the flow length as would be expected, but there is a discrete drop in temperature of the coolant at each location where additional coolant is brought in through the secondary inlets 138. This characteristic tends to increase the temperature difference and thus the heat transfer effectiveness. Entrainment may occur at several locations spaced along the flow length of the heat exchanger 100.

Figure 5:
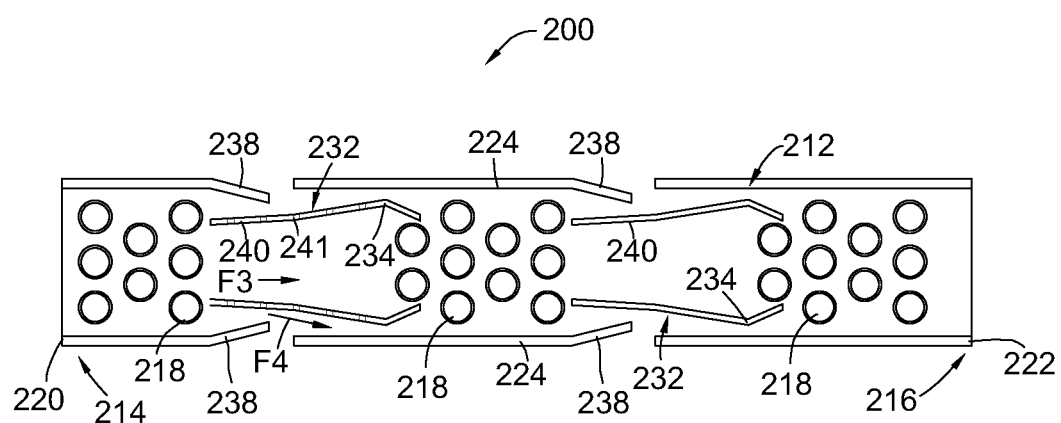
FIG. 5 is a schematic cross-sectional view of an alternative heat exchanger.

FIG. 5 illustrates another exemplary heat exchanger 200 using the entrainment principle. The heat exchanger 200 is similar in construction to the heat exchanger 100 described above and includes a shell or housing 212 having an upstream end 214 defining an inlet 220, and a downstream end 216 defining an outlet 222. The shell 212 is defined by walls 224. A plurality of tubes 218 extend across the shell 212.

At one or more locations downstream from the upstream end 214, internal baffles 240 are disposed in the shell 212 which are configured so as to define a nozzle or area reduction 232 having a throat 234 of minimum flow area. The shell 212 further includes one or more secondary inlets 238 just upstream of the throat 234.

The nozzle 232 and the secondary inlets 238 operate in substantially the same manner as described above to entrain additional coolant into the primary flow during operation. One difference is that the use of the baffles 240 divides the primary flow into inner and outer portions, denoted F3 and F4, respectively. The inner portion F3 flows straight through the shell 212 and does not experience mixing, and the outer portion mixes entrained coolant with the primary flow. Therefore, the downstream tube bundle receives a mixture of coolant from the upstream tube bundle and mixed coolant. As compared to the heat exchanger 100 described above this example provides less "refreshing" of low-temperature coolant, but retains more flow energy. Optionally, the baffle 240 may be perforated with apertures 241 so that there is mixing of primary and entrained coolant upstream of the second tube.

Figure 6:
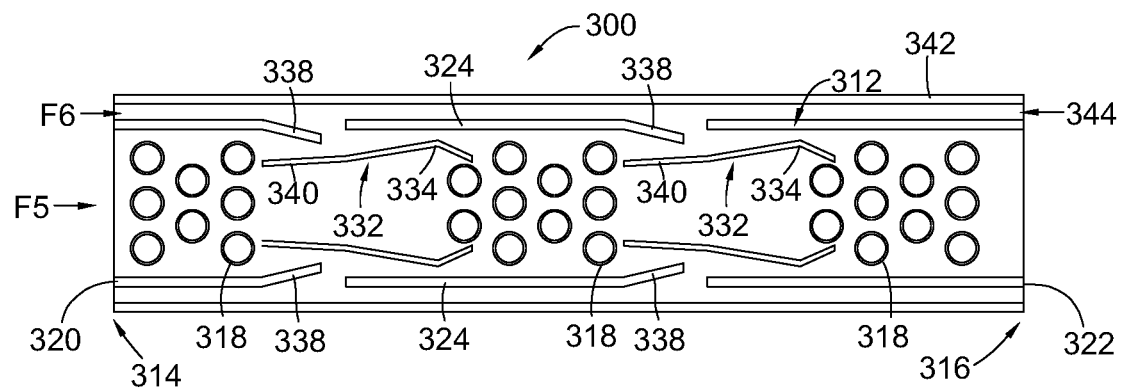
FIG. 6 is a schematic cross-sectional view of another alternative heat exchanger.

FIG. 6 illustrates another exemplary heat exchanger 300 using the entrainment principle. The heat exchanger 300 is similar in construction to the heat exchanger 200 described above and includes a shell or housing 312 having an upstream end 314 defining an inlet 320, and a downstream end 316 defining an outlet 322. The shell 312 is defined by walls 324. A plurality of tubes 318 extend across the shell 312. The heat exchanger 300 additionally incorporates an outer housing 342 which surrounds the shell 312 such that a bypass duct 344 is defined between the shell 312 and the outer housing 342.

At one or more locations downstream from the upstream end 314, internal baffles 340 are disposed in the shell 312 which are configured so as to define a nozzle or area reduction 332 having a throat 334 of minimum flow area. The shell 312 further includes one or more secondary inlets 338 just upstream of the throat 334.

The nozzle 332 and the secondary inlets 338 operate in substantially the same manner as described above to entrain additional coolant into the primary flow during operation. One difference is that the presence of the bypass duct 344 provides a defined flowpath for the fluid that is to be entrained. The primary fluid is thus split at the upstream end 314 such a portion "F5" passes through the tube bundle 318 and another portion "F6" is used to be entrained. It is noted that a bypass duct as shown in FIG. 6 may be used with any of the other entrainment concepts described herein.

Figure 7:
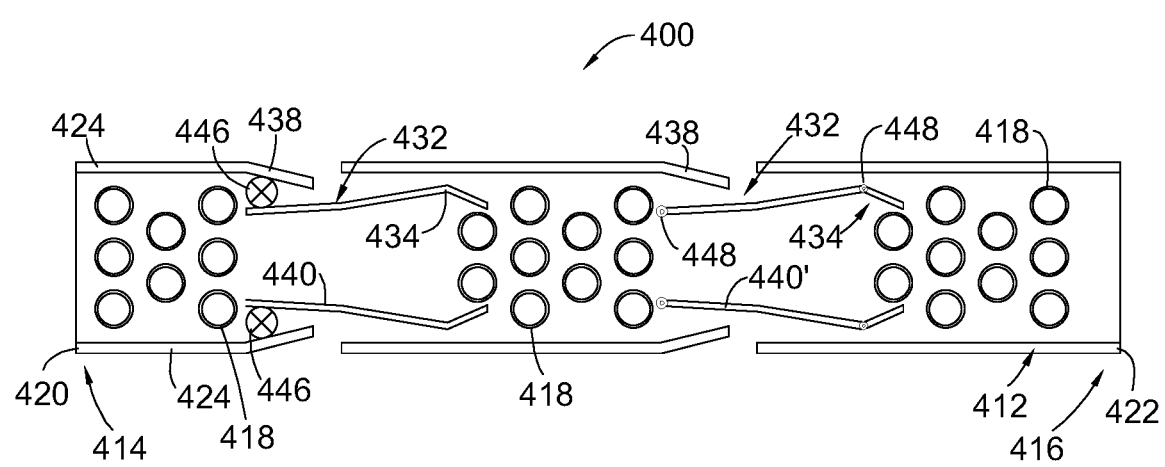
FIG. 7 is a schematic cross-sectional view of another alternative heat exchanger.

FIG. 7 illustrates another exemplary heat exchanger 400 using the entrainment principle. The heat exchanger 400 is similar in construction to the heat exchanger 200 described above and includes a shell or housing 412 having an upstream end 414 defining an inlet 420, and a downstream end 416 defining an outlet 422. The shell 412 is defined by walls 424. A plurality of tubes 418 extend across the shell 412.

At one or more locations downstream from the upstream end 414, internal baffles 440 are disposed in the shell 412 which are configured so as to define a nozzle or area reduction 432 having a throat 434. The shell 412 further includes one or more secondary inlets 438 just upstream of the throat 434.

The nozzles 432 and the inlets 438 operate in substantially the same manner as described above to entrain additional coolant into the primary flow during operation.

The heat exchanger 400 includes a flow control apparatus for modulating the entrainment flow, such as a valve and/or a moveable baffle. For example, the heat exchanger 400 may incorporate one or more controllable valves 446. Each controllable valve 446 is located just upstream of one of the secondary inlets 438. When the controllable valve 446 is open, primary flow passing through the nozzle 432 provides a driving force for entraining additional fluid flow. When the controllable valve 446 is closed, the driving force is absent, and external coolant is not entrained. The controllable valve 446 may be set at an intermediate position to modulate flow as desired. As another example, one or more of the baffles may be moveable. For example, baffle 440' is shown as being articulated at points 448, permitting the baffle 440' to move selectively between various positions, for example using one or more actuators (not shown). When the baffle 440' is in the position shown in FIG. 7, primary flow passing through the nozzle throat 434 provides a driving force for entraining additional fluid flow. The baffle 440' can be pivoted inboard of this position and/or "flattened" to open the area of the throat 434 to reduce or eliminate the driving force is absent. Alternatively it can be pivoted to an extreme outboard position to effectively close off flow through the nozzle 432.

The controllable valve 446 or moveable baffle 440' may be used to modulate entrainment flow for various purposes. As an example, when used in an aircraft gas turbine engine, a situation could occur where entrainment of coolant is not required in conditions such as high-altitude cruise (because the primary flow of coolant is at a lower temperature), but entrainment is required in more demanding conditions such as ground idle. It is also possible to modulate the primary coolant flow, for example where the primary coolant flow is compressor bleed air which is expensive to the engine operating cycle. For example, the amount of primary flow bleed air could be reduced by activating the entrainment function to improve the heat transfer efficiency.

Figure 8:
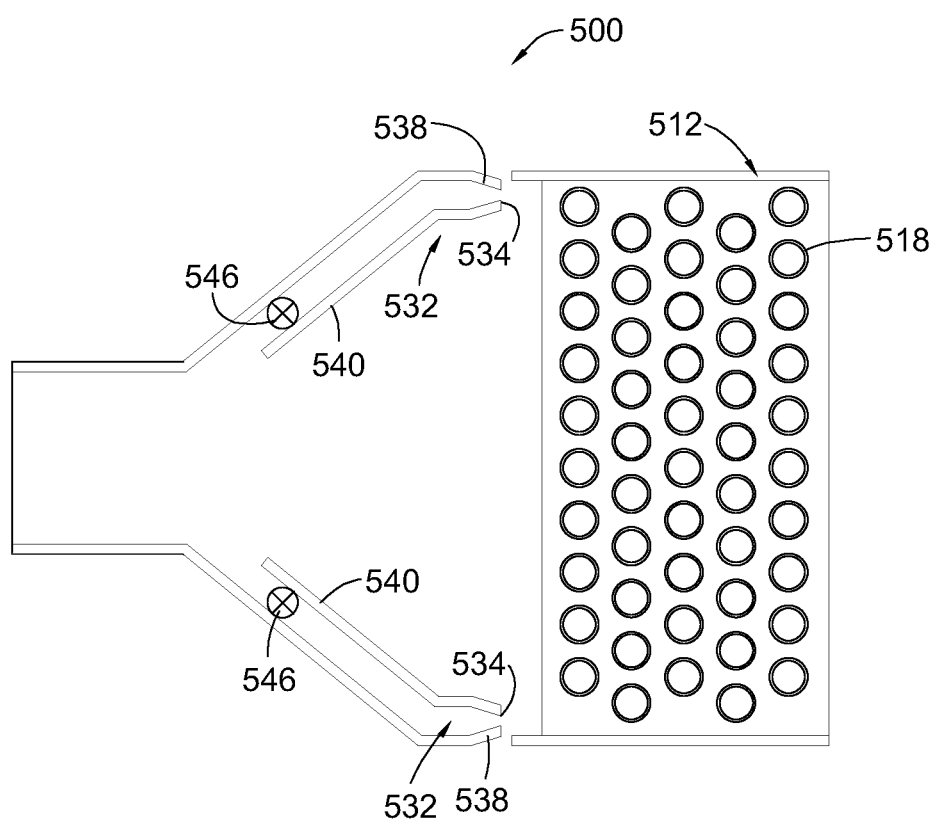
FIG. 8 is a schematic cross-sectional view of another alternative heat exchanger.

The modulation principle may be used with various types of heat exchangers, including heat exchangers having a low aspect ratio and/or heat exchangers having only a single bank or stage of tubes. For example, FIG. 8 illustrates another exemplary heat exchanger 500 using the entrainment principle. The heat exchanger 500 includes a shell or housing 512 with a plurality of tubes 518 extending across the interior of the shell 512.

Upstream of the tubes 518, internal baffles 540 are disposed in the shell 512 which are configured so as to define a nozzle or area reduction 532 having a throat 534. The shell 512 further includes one or more secondary inlets 538 just upstream of the throat 534.

The nozzle 532 and the secondary inlets 538 are configured so that their operation affects only a portion of the tubes 518. In the illustrated example, the nozzles 532 and the secondary inlets 538 are positioned adjacent the lateral boundaries of the shell 512 so that they affect the outboard tubes 518 but to do not affect the inboard or centrally located tubes 518.

A controllable valve 546 is located just upstream of each of the secondary inlets 538. When the controllable valve 546 is open, primary flow passing through the nozzle 532 provides a driving force for entraining additional fluid flow. When the controllable valve 546 is closed, the driving force is absent, and external coolant is not entrained.

The heat exchangers described herein have numerous advantages over prior art heat exchangers. In particular, they have the potential to reduce the amount of coolant required to achieve a desired heat transfer rate. In the context of a gas turbine engine, this provides the potential to reduce bleed air flow requirements and reduce heat exchanger weight. This entrainment concept may also be implemented to prevent "worst-case" operating conditions of a piece of equipment dictating the physical size of the heat exchanger.

Figure 9:
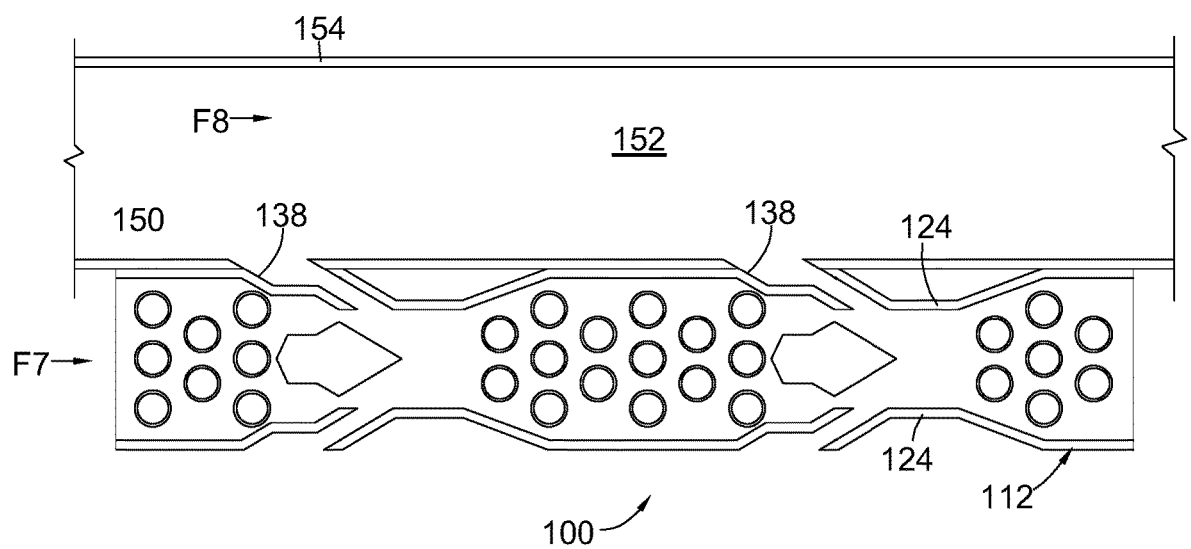
FIG. 9 is a schematic cross-sectional view of the heat exchanger of FIG. 1 disposed adjacent a flowpath wall.

An additional use of the heat exchangers described herein is to provide boundary layer control. For example, FIG. 9 shows the heat exchanger 100 of FIG. 3 with one of the walls 124 defining the shell 112 positioned adjacent to an inner wall 150 which defines a portion of a flowpath 152, in cooperation with an outer wall 154. Optionally, the inner wall 150 and the wall 124 could be a single integral structure. This flowpath 152 could be representative of, for example, a fan bypass duct in a gas turbine engine, or alternatively (without outer wall 154) it could be representative of a flowpath surface such as a fan flowpath surface in an open-rotor gas turbine engine.

In operation, a primary flow "F7" of a first fluid flows through the shell 112 as described above. A second fluid at a second temperature flows through the tubes 118.

A flow "F8" passes through the duct 152, for example generated by an upstream fan (not shown). This can also be described as a third fluid and would be at a third temperature. It may or may not come from the same source as the primary flow F7. A boundary layer is present along the surface of the inner wall 150. This boundary layer flow would be entrained into the heat exchanger 100 through the secondary inlets 138. Using the heat exchanger 100 to entrain air from the flow F8 will provide a boundary layer control function and improve thrust efficiency of the fan.

It is noted that the concepts described herein are applicable to any heat exchanger configuration. For example, various tube cross section shapes and tube pitches may be employed, as well as various heat transfer enhancement features such as fins, pins, ribs, turbulence promoting structures, etc.

Is it further noted that various cross sectional shapes may be employed on both the tubes and the shell of the heat exchangers described herein, for example for the purpose of controlling flow and pressure drop. For example, the banks of tubes described above may be shrunk near the nozzles for better flow control.

The foregoing has described heat exchangers. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A heat exchanger apparatus, comprising:
   a shell extending over a flow length from an inlet at an upstream end to an outlet at a downstream end, and defining a first flowpath for a first fluid;
   a structure disposed within the shell defining a second flowpath for a second fluid, the structure including a plurality of heat exchange elements spaced along the flow length, wherein the plurality of heat exchange elements are positioned in the first flowpath and communicate with the first fluid;
   at least one secondary inlet formed in a surface of the shell disposed downstream from the upstream end, downstream of at least one of the plurality of heat exchange elements and upstream of at least one of the plurality of heat exchange elements;
   a baffle disposed in the shell and extending from a first heat exchange element of the plurality of heat exchange elements to a second heat exchange element of the plurality of heat exchange elements across the at least one secondary inlet; and
   a nozzle disposed downstream of the at least one secondary inlet, the baffle and the shell forming an area of reduction therebetween to define the nozzle.

2. The apparatus of claim 1 wherein the heat exchange elements are tubes.

3. The apparatus of claim 2 wherein the tubes are grouped into a plurality of bundles spaced along the flow length.

4. The apparatus of claim 1 wherein the shell has a characteristic dimension at the inlet, and an aspect ratio of the flow length divided by the characteristic dimension is unity or greater.

5. The apparatus of claim 1 wherein the nozzle is defined by spaced-apart walls of the shell.

6. The apparatus of claim 5 further comprising a centerbody disposed between the walls upstream of a throat of the nozzle.

7. The apparatus of claim 1 wherein the baffle is perforated.

8. The apparatus of claim 1 further comprising an outer housing which surrounds the shell such that a bypass duct is defined between the shell and the outer housing.

9. The apparatus of claim 1 further comprising a flow control apparatus operable to selectively control flow through the nozzle.

10. A heat exchanger apparatus for a gas turbine engine, comprising:
    a shell extending over a flow length from an inlet at an upstream end to an outlet at a downstream end, and defining a first flowpath for a first fluid, wherein the shell has a characteristic dimension at the inlet, and an aspect ratio of the flow length divided by the characteristic dimension is unity or greater;
    a plurality of tubes disposed within the shell extending traverse to the flow direction, and defining a second flowpath for a second fluid, wherein the plurality of tubes are grouped into a plurality of bundles spaced along the flow length;
    at least one secondary inlet formed in a surface of the shell disposed downstream from the upstream end, downstream of at least one of the plurality of bundles, and upstream of at least one of the plurality of bundles;
    a baffle disposed in the shell and extending from a first tube of the plurality of tubes to a second tube of the plurality of tubes across the at least one secondary inlet; and
    a nozzle disposed downstream of the at least one secondary inlet, wherein a coolant flows through the at least one secondary inlet and through the nozzle without flowing over the plurality of bundles, the baffle and the shell forming an area of reduction therebetween to define the nozzle.

11. The apparatus of claim 10 wherein the nozzle is defined by spaced-apart walls of the shell.

12. The apparatus of claim 10 further comprising an outer housing which surrounds the shell such that a bypass duct is defined between the shell and the outer housing.

13. The apparatus of claim 10 wherein the inlets are disposed in fluid communication with a wall that defines a flowpath.

14. The apparatus of claim 13 wherein the flowpath is a fan bypass duct of a gas turbine engine.

15. A method of operating a heat exchanger, comprising:
    flowing a primary flow of a first fluid at a first temperature through a shell that extends over a flow length from an inlet at a upstream end to an outlet at a downstream end;
    flowing a second fluid at a second temperature different from the first temperature through a structure disposed within the shell, such that heat is transferred from one of the fluids to the other fluid, the structure including a plurality of heat exchange elements spaced along the flow length; and
    entraining a secondary flow of a fluid into the shell through at least one secondary inlet formed in a surface of the shell disposed downstream from the upstream end, downstream of at least one of the plurality of heat exchange elements, and upstream of at least one of the plurality of heat exchange elements, a baffle disposed within the shell and extending from a first heat exchange element of the plurality of heat exchange elements to a second heat exchange element of the plurality of heat exchange elements across the at least one secondary inlet, a nozzle disposed downstream of the at least one secondary inlet, the baffle and the shell forming an area of reduction therebetween to define the nozzle, wherein the secondary flow of fluid mixes with a portion of the primary flow of the first fluid prior to flowing over at least one of the plurality of heat exchange elements, such that the at least one of the plurality of heat exchange elements receives both the primary flow and mixture of primary and secondary flows.

16. The method of claim 15 further comprising flowing the primary flow through the nozzle disposed downstream of the secondary inlet so as to provide a driving force for entraining the secondary flow.

17. The method of claim 16 further comprising modulating the secondary flow by selectively blocking flow through the nozzle.

18. The method of claim 15 further comprising entraining the secondary flow into the shell at multiple locations spaced along the flow length.

19. The method of claim 15 wherein the shell has a flow area, and an aspect ratio of the flow length divided by the flow area is unity or greater.

20. The method of claim 15 wherein the secondary flow is drawn from a boundary layer region of a third fluid at a third temperature flowing in a flowpath external to the shell.

* * * * *